United States Patent
Herrmann et al.

(10) Patent No.: US 6,318,529 B1
(45) Date of Patent: Nov. 20, 2001

(54) CONDUCTOR RAILS, THE USE THEREOF AND METHODS OF MANUFACTURE

(75) Inventors: Stephan Herrmann, Bieberqemünd; Uwe Bock, Singen, both of (DE)

(73) Assignee: Alusuisse Technology & Management Ltd., Rheinfall (CH)

( * ) Notice: Subject to any disclaimer, the term of this patent is extended or adjusted under 35 U.S.C. 154(b) by 0 days.

(21) Appl. No.: 09/431,560

(22) Filed: Oct. 29, 1999

(30) Foreign Application Priority Data

Nov. 2, 1998 (DE) ............................................. 198 50 349
Dec. 10, 1998 (DE) ............................................. 198 57 115

(51) Int. Cl.[7] .................................................... B60A 1/34
(52) U.S. Cl. .................................................. 191/29 DM
(58) Field of Search ........................... 191/22 DM, 22 R, 191/29 DM

(56) References Cited

U.S. PATENT DOCUMENTS

| | | |
|---|---|---|
| 3,836,394 * | 9/1974 | Kugler et al. ................ 191/22 DM |
| 4,215,560 | 8/1980 | Ames et al. . |
| 5,161,667 * | 11/1992 | Kilburg .......................... 191/29 DM |
| 5,263,561 * | 11/1993 | Plichta .......................... 191/29 DM |
| 5,310,032 * | 5/1994 | Plichta .......................... 191/29 DM |
| 5,918,712 | 7/1999 | Wompner et al. . |

* cited by examiner

*Primary Examiner*—S. Joseph Morano
*Assistant Examiner*—Robert J. McCarry, Jr.
(74) *Attorney, Agent, or Firm*—Bachman & LaPointe, P.C.

(57) ABSTRACT

A conductor rail having a rail-like support section made of metallic material, in particular a support section which is I-shaped in cross-section, and which has at least one other component of another metal attached to it, has a light metal body acting as conductor section—in particular an extruded section of an aluminium alloy—mounted in at least one of the side channels of a ferrous support section, the component of higher strength material covering the outwards facing surface of the conductor section. This conductor section is fitted by mechanical locking into the side channel, the light metal body of the conductor section may reside in the side channel under compression.

21 Claims, 2 Drawing Sheets

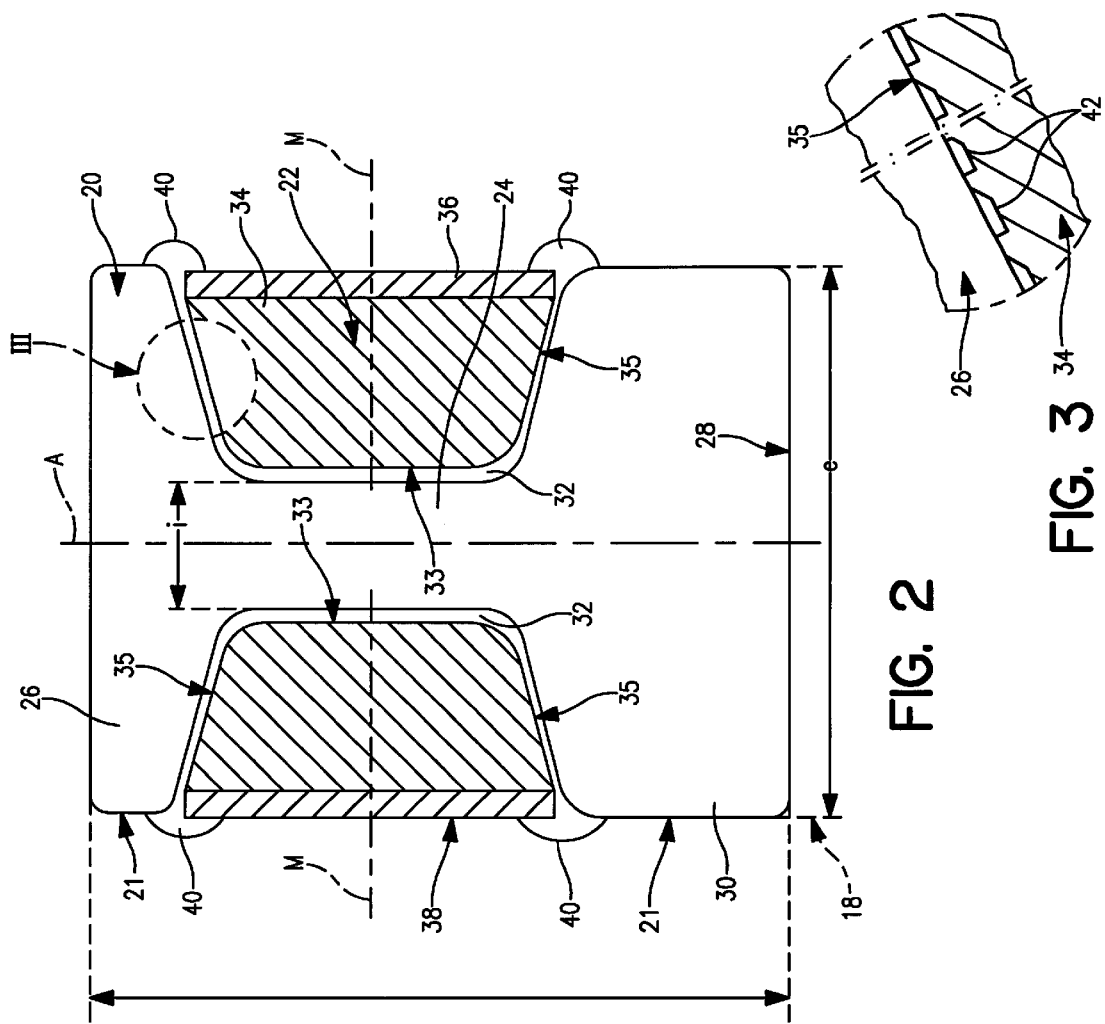
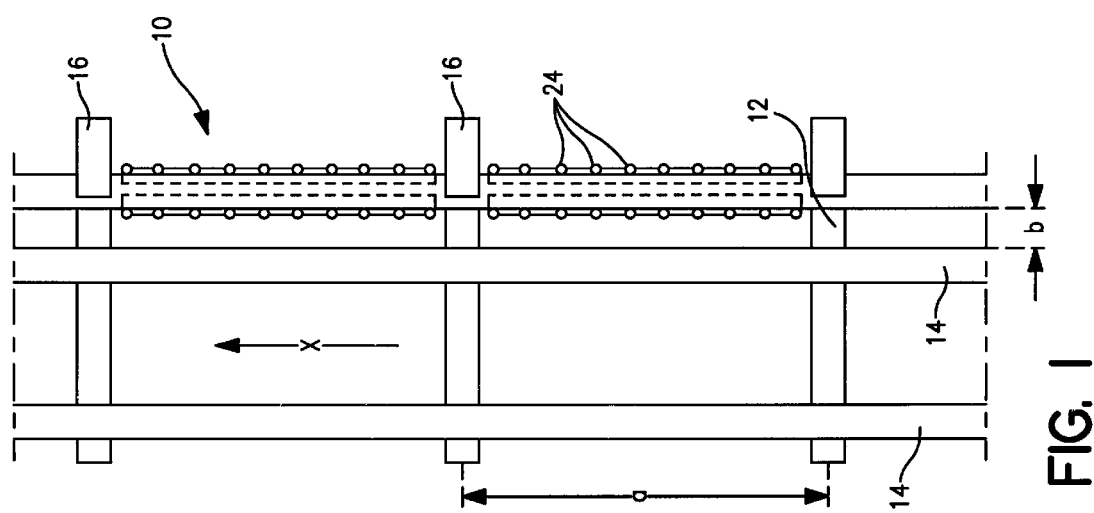

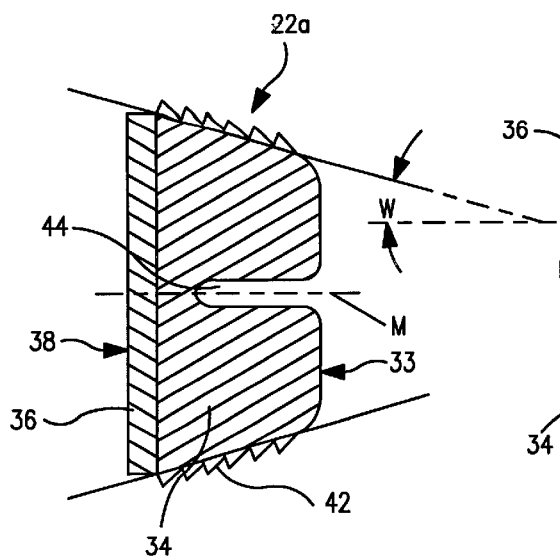
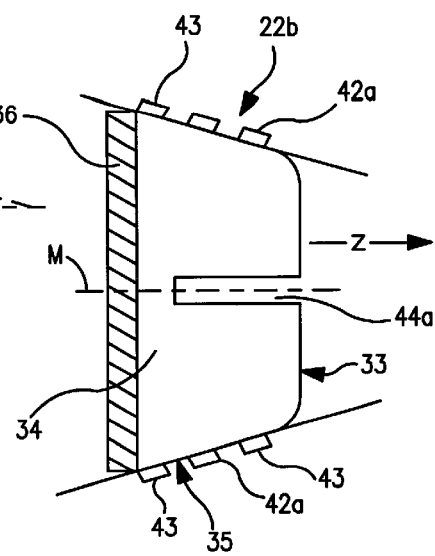
FIG. 4
FIG. 5
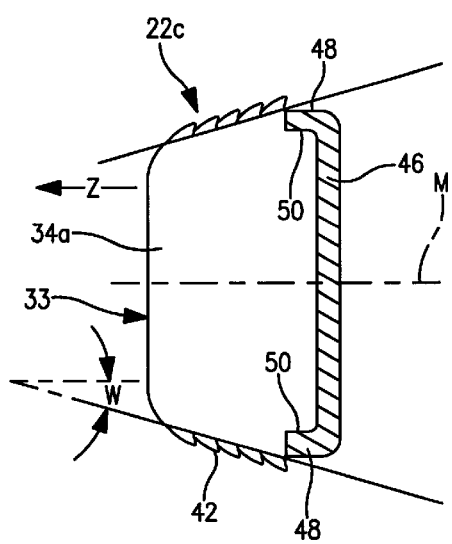
FIG. 6
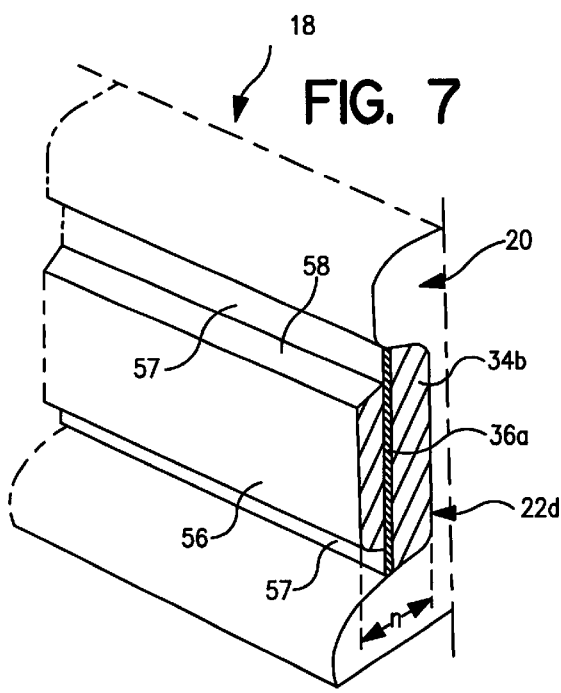
FIG. 7
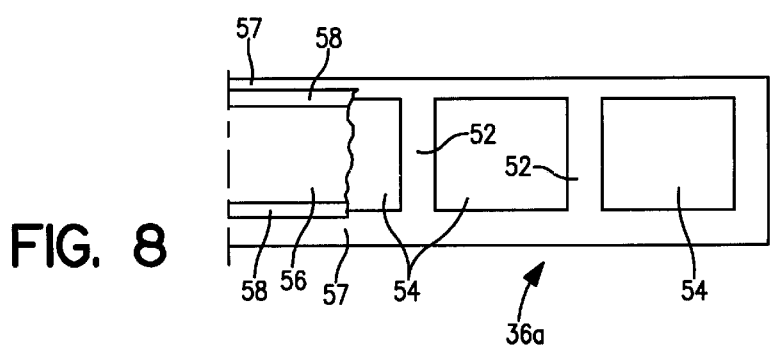
FIG. 8

CONDUCTOR RAILS, THE USE THEREOF AND METHODS OF MANUFACTURE

BACKGROUND OF THE INVENTION

The invention relates to a conductor rail having a rail-like support section made of metallic material, in particular a support section which is I-shaped in cross-section and has at least one component of another metal attached to it. Furthermore, the scope of the invention includes a use of the conductor rail and a process for its manufacture.

Known from U.S. Pat. No. 5,918,712 is a composite section featuring a support section or body made of light weight metallic material and at least one strip of another material of greater wear resistance which is joined to the support section or body during extrusion. Composite sections that are I-shaped in cross-section and exhibit a rail base, rail neck and rail head are described, the head part being covered by a strip running in the direction of the longitudinal axis; the latter provides a wear-resistant power transfer surface for the sliding contact shoe. This composite section is manufactured out of an aluminium alloy by means of extrusion in one single step during which the strip is fed into the extrusion press.

Known from U.S. Pat. No. 4,215,560 is a process for manufacturing conductor rails from a support section and at least one strip of another metal which forms at least part of the covering surface of the support section. Also here the support section is formed during extrusion by pressing a block of metal through the shape-giving opening of an extrusion die; at the same time the strip runs through the die opening parallel to the longitudinal axis of the die. Also—on making use of strips that have not been plated in advance—at least two composite sections are produced simultaneously, this in order to ensure adequate bonding between the support section and the covering layer; the areas of support section to be provided with a covering layer face each other and are fed a pair of strips that are in contact with each other and pass through the shape-giving opening in the die.

Although new power supply units are fitted with aluminium/steel composite conductor rails—this in view of their significantly better electrical conductivity—the electrification of the larger part of the approximately 11'000 km stretch of railway line, in particular in underground railways, involves soft iron conductor rails and so called light mail vehicles.

Retro-fitting such oonductor systems involves exchanging the conductor rails completely, which means down time and therefore—in addition to the investment and installation costs—also considerable losses due to down time on the stretch of track in question.

In view of this state of the art the object of the present invention is to enable steel conductor rails to be retrofitted; it should be possible to retro-fit the whole power supply facility with a ready-made conductor rail that meets the requirements e.g. during overnight down time and without expensive installation costs. Furthermore, it should be possible to employ ready assembled conductor rails with profile rails for new installations.

SUMMARY OF THE INVENTION

The foregoing object is achieved by way of the invention by providing a conductor rail which comprises a rail-like support section made of ferrous material, the rail-like support section being shaped in cross section to define at least one side channel, a light metal body, in particular an extruded section made of an aluminium alloy, which is mounted in at least one of the side channels of the rail or support section made of a ferrous material in particular soft iron, running parallel to the longitudinal axis of the rail or support section, said light metal body forming a conductor section the outward facing surface of which, as installed, has—at least in places—the component made of higher strength metal covering it.

According to another feature of the invention at least one of the side faces of the light metal body of that conductor section exhibits a saw-tooth profile or is provided with longitudinal ribs that define a channel-like cross-section on this side face.

The trapezium-shaped cross-section of the conductor section should advantageously taper towards its back face—this to match the side channel in the supporting section which tapers in cross-section towards the strut of that support section; the line along the middle of the conductor section is thereby preferably a line of symmetry with respect to the conductor section.

Such a conductor section—for which protection is sought independently in respect of its shape and use—makes it possible to retro-fit the widely common soft iron I-sections which exhibit on both sides of a central strut side channels delimited by flanges, and to do so without expensive boring and bolting operations; the light metal body matching the cross-section of the side channels may be secured by virtue of shape in the side channels and locked in preferably by the application of pressure. It has also been found to be favourable to join the conductor section by thermal means to the supporting section. Furthermore, on creating the mechanical fit a cold weld joint may be formed, and it is possible to secure the conductor in place by means of spot welding; the latter involves joining the component of a heavy metallic material—especially a steel strip—to the supporting section.

As a result of the invention therefore, for steel conductor rails already installed and in use—e.g. conductor rails according to standard DIN 43 156—an exactly fitting section of Al 99.5 or the like alloy with profiled side faces is provided, which can be pressed in situ into the conductor rail using an appropriately designed hydraulic device. In the process the projecting profile rills on the aluminium component are squashed; ideally cold welding takes place between the soft iron of the conductor rail and the retrofitted additional conductor material.

According to the invention the light weight metal of the conductor section can be provided with a blind slit running from its rear surface towards the strut in the support section, this in order to compensate for tolerances; for that purpose a strain relieving groove may be press formed into the light metal body or a longitudinal slit machined there. In both cases the provision of the groove, which can alter the cross-section, achieves an improvement in the mechanical locking—this also as an alternative to profiling the surface.

The steel covering which is integrated in the conductor section and is preferably joined in an intermetallic manner by an extrusion process, should as described enable the conductor section and the support section to be welded together without difficulty. This effect can also be achieved by choosing for the other component a groove shaped steel sheet of superior wear resistance and clamping the two side flanges of the steel sheet onto shoulder-like parts of the light metal body. In both versions it is favourable for the side faces of the support section or its flange to be approximately flush with the free surface of the covering component.

In the system comprising conductor rail and side-mounted conductor sections the transfer of electric power takes place at the side faces in the manner of a conductor section pressed in like a wedge. Initial calculations indicate that the electrical resistance of the conductor rail can be reduced by more than 50%, thereby reaching the range of new aluminium/steel composite conductor rails.

Further advantages, features and details of the invention are revealed in the following description of preferred exemplified embodiments and with the aid of the drawing which shows in.

BRIEF DESCRIPTION OF DRAWINGS

FIG. 1: a schematic plan view of a rail track with conductor rail mounted at the side;

FIG. 2: end view of a conductor rail, enlarged compared with FIG. 1;

FIG. 3: an enlarged detail of part of the section shown in FIG. 2, viewed as indicated by the arrow III;

FIG. 4 to FIG. 6: are cross-sections through three different retro-fit sections for the composite conductor rail;

FIG. 7 a perspective view of a section of a further, axially halved composite conductor rail;

FIG. 8: the plan view of a strip-shaped element of that shown in FIG. 7.

DETAILED DESCRIPTION

A rail track 10 shown schematically in FIG. 1 is such that a pair of traction rails 14 are mounted on and cross so called sleepers lying parallel to each other a distance a of ca. 500 mm apart. Beside the right traction rail 14—with respect to the direction of travel x—a short distance b from that rail 14 on supports 16 and mounted at a different height are composite conductor rails 18 (see FIG. 2) comprising a steel section 20 with light weight conductor sections 22 mounted on both sides. The steel section 20 referred to here may be a conductor rail of steel according to DIN 43 156-A5100 of breadth e equal to 80 mm +/−1.5 mm and height h equal to 105 mm +/−1.5 mm.

The steel section 20 of I-shaped cross-section exhibits—on both sides of a strut 24 which is vertical in FIG. 2 and is of breadth i, here 18 mm—side channels 32 which, as viewed in cross-section, open up conically each delimited by a top flange 26 and a base flange 30 which provides a sliding contact face 28 for power transfer.

Each of the conductor sections 22 in FIG. 2 is a composite section comprising a light metal body 34 which is trapezium shaped (material here: Al 99.5) and a steel strip 36 which is joined to the light metal body 34 during an extrusion operation. The cross-section of this light metal body 34 corresponds to that of channel 32 which tapers in a wedge-like manner towards its back wall and runs parallel to the transverse axis A of the steel section 20; the conductor section 22 is fitted into that channel 32 in such a manner that the surface 38 of the steel strip 36 is approximately flush with the neighbouring side wall surfaces 21 of the steel section 20 acting as support section. The latter is then joined to the composite conductor sections 22 by means of spot welds indicated here by the numeral 40. It should be pointed out here that the conductor section 22 is tightly fitted into the channels 32; its distance from the neighbouring contour of the channel 32 is exaggerated in FIG. 2.

Both of the side walls 35 of the light metal body, sloping at an angle w to the middle line M of the conductor section 22, preferably feature a saw-tooth profile 42—shown in FIG. 3.

The composite sections 22a and 22b in FIGS. 4 and 5 exhibit along the middle line M a machined strain-relieving slit 44a which serves to accommodate tolerances. In composite section 22b, instead of the described saw-tooth profile 42 with outer edges pointing in the direction of insertion z, there are longitudinal ribs 43 of a spring-like profile 42a, which is channel-shaped as viewed in cross-section.

The light metal section 22c shown in FIG. 6 comprises a light metal body 34a with a steel sheet 46—channel-shaped in cross-section—attached to it; this is clamped, by means of its short, bent over flanges 48, onto shoulder-like steps 50 on the light metal body 34a in such a manner that the short flanges 48 join up with the end region of the saw-tooth profile 42.

The conductor section 22d shown in FIG. 7 features a light metal body 34b of breadth n to which is fitted a ladder-like steel strip 36a featuring spars 52 between window-shaped recesses 54; the window-shaped recesses 54 are penetrated by a second part 56 of the light metal body 34b running in front of the steel strip 36a. Exposed parts 57 of the steel strip 36a can be seen along its longitudinal edge. The spot welds 40 are made here when installed.

In order to provide a better understanding, the retrofitting of conductor rails is illustrated in the following for an underground railway fitted with steel conductor rails 20 (so called third rail), electric current being fed to it every 5'000 m and supports 16 for the conductor rail 20 provided a distance a of 500 cm apart:

Resistance of the steel conductor rail: $R_S = 23$ mΩ/km;

Resistance of the retro-fitted rail, $R_N$:

---

$A_S$ = 5,100 mm2 (low carbon iron, = ca 0.1173 Ωmm$^2$/m);
$R_S$ = 23 μΩ/m for "old conductor rail";
$A_{Al}$ = 2,500 mm2 (Al 99.5, = 0.28 Ωmm$^2$/m)
$R_{Al}$ = 11.2 μΩ/m for Al cross-section;
$A_{SB}$ = 440 mm2 (steel strip, = ca. 0.25 Ωmm$^2$/m);
$R_{SB}$ = 568.2 μΩ/m for steel strip;
$1/R_N = 1/R_S + 1/R_{Al} + 1/R_{SB} = R_N = 7.43$ μΩ/m

---

In the calculation the supports and the connections ca. 20% are included in $R_S$ and the retro-fitted length ca. 80% included in $R_N$.

For a stretch of l=5,000 m therefore the following holds:

Without retrofitting:

---

R = 5,000 m × 23 μΩ/m
  = 0,115 Ω
With retro-fitting:
R1 = 1,000 mm × μΩ/m
  = 0.023 Ω
R2 = 4,000 m × 7.43 μΩ/m
  = 0.030 Ω
R = 0.053 Ω

---

It can be seen that as a result of retrofitting the steel conductor rail its electrical resistance can be lowered by more than 50%. The corresponding reduced power losses are derived from $Pv = J^2 \times R$. However the energy savings depend ultimately on the system as a whole (e.g. on the method of feeding current, power regeneration and the like).

What is claimed is:

1. A conductor rail comprising:
   a rail-like support section made of ferrous material, the rail-like support section being shaped in cross section to define at least one side channel;
   a light metal body comprising an extruded section of an aluminum alloy, which functions as a conductor section, mounted in the at least one side channel of the support section, the light metal body having an outward facing surface facing away from the channel; and a component which spans the outward facing surface of the light metal body wherein said component is formed of a higher strength material than the light metal body.

2. A conductor rail according to claim 1, wherein the conductor section is pressed and mechanically locked into the at least one side channel.

3. A conductor rail according to claim 1, wherein the light metal body of the conductor section is positioned in the channel under compressive force.

4. A conductor rail according to claim 1, wherein the conductor section is attached to the support section by thermal means.

5. A conductor rail according to claim 1, wherein the component is metal and is welded to the support section.

6. A conductor rail according to claim 1, wherein the light metal body of the conductor section is provided with a dead end slit facing the at least one side channel, to accommodate tolerances.

7. A conductor rail according to claim 1, wherein the light metal body features a strain-relieving groove shape-formed therein.

8. A conductor rail according to claim 1, wherein the light metal body features a strain-relieving groove machined therein.

9. A conductor rail according to claim 1, wherein the light metal body has a pair of side faces and at least one of the side faces of the light metal body of the conductor section features a saw-tooth profile.

10. A conductor rail according to claim 1, wherein the light metal body has a pair of side faces and at least one of the side faces of the light metal body of the conductor section features longitudinal ribs which define a channel-like cross-section.

11. A conductor rail according to claims 1, wherein the side channel in the support section tapers in cross-section towards the bottom of the support section, the light metal body has a trapezium shaped cross-section which tapers away from the component means.

12. A conductor rail according to claim 11, wherein a middle line (M) through the cross-section of the conductor section is a line of symmetry.

13. A conductor rail according to claim 12, wherein the light metal body is intermetallically bonded to the component covering the outward facing surface thereof.

14. A conductor rail according to claim 1, wherein the component comprises a channel-shaped steel sheet having two side flanges which are clamped onto a shoulder on the light metal body.

15. A conductor rail according to claim 1, wherein side faces of the support section are approximately flush with an outward surface of the component.

16. A conductor rail according to claim 1, wherein an insert of high strength metal is incorporated in the light metal body, the insert includes at least along a part of a longitudinal edge, a free surface which borders approximately onto the conductor rail.

17. A conductor rail according to claim 16, wherein the insert includes a steel strip having openings, the insert is embedded in the light metal body and covered by a part of the light metal body in such a manner that strips of the steel remain exposed at the longitudinal edge.

18. A process for manufacturing a conductor rail according to claim 1, wherein the conductor section is pressed into the side channel and the light metal body is deformed to a limited extent in the region of its side face.

19. A process according to claim 18, wherein a profile on the light metal body is deformed.

20. A process according to claim 18, wherein the conductor rail of mild steel and the light metal body are cold welded.

21. A process according to claim 18, wherein, prior to installation, the light metal body is opened wider in the region of a strain-relieving groove.

* * * * *